United States Patent [19]

Tsoukala et al.

[11] Patent Number: 5,360,557
[45] Date of Patent: Nov. 1, 1994

[54] HOLE-TRAP-COMPENSATED SCINTILLATOR FOR COMPUTED TOMOGRAPHY MACHINE

[75] Inventors: Veneta G. Tsoukala, Clifton Park; Charles D. Greskovich, Schenectady, both of N.Y.

[73] Assignee: General Electric Company, Schenectady, N.Y.

[21] Appl. No.: 203,078

[22] Filed: Feb. 28, 1994

Related U.S. Application Data

[60] Division of Ser. No. 960,203, Oct. 13, 1992, which is a continuation of Ser. No. 546,824, Jun. 29, 1990, abandoned.

[51] Int. Cl.$^5$ ............................................. G01T 1/202
[52] U.S. Cl. ................................................. 250/361 R
[58] Field of Search ............ 252/301.4 R; 250/361 R

[56] References Cited

U.S. PATENT DOCUMENTS

| | | | |
|---|---|---|---|
| 3,591,517 | 7/1971 | Van Der Ziel et al. | 252/301.4 R |
| 4,824,598 | 4/1989 | Stokowski | 252/301.4 R |
| 5,057,692 | 10/1991 | Greskovich et al. | 252/301.4 R |

FOREIGN PATENT DOCUMENTS

| | | |
|---|---|---|
| 91108424 | 1/1992 | European Pat. Off. |
| 2719611 | 12/1977 | Germany |
| 3530180 | 2/1987 | Germany |
| 3704813 | 8/1988 | Germany |
| 62-501169 | 5/1987 | Japan |
| 63-309583 | 12/1988 | Japan |

OTHER PUBLICATIONS

D. J. Robbins et al., "The Temperature Dependence of Rare Earth Activated Garnet Phosphors–I. Intensity and Lifetime Measurements on Undoped and Ce–Doped $Y_3Al_5O_{12}$", J. Electrochemical Society, vol. 126, No. 7, Jul. 1979, pp. 1213–1220.

D. J. Robbins et al., "The Temperature Dependence of Rare–Earth Activated Garnet Phoslphors–II. A Comparative Study of $Ce^{3+}$, $Eu^{3+}$, $Tb^{3+}$, and $Gd^{3+}$ in $Y_3Al_5O_{12}$", J. Electrochemical Society, vol. 126, No. 7, Jul. 1979, pp. 1221–1228.

D. J. Robbins et al., "The Relationship Between Concentration and Efficiency in Rare Earth Activated Phosphors", vol. 126, No. 9, Sep. 1979, pp. 1556–1563.

D. J. Robbins et al., "The Effects of Core Structure on Radiative and Non-Radiative Recombinations at Metal Ion Substituents in Semiconductors and Phosphors", Advances in Physics, vol. 27, No. 4, 1978, pp. 499–532 no month.

Shmulovich et al., "Chem. Abstracts", vol. 102, 1985, 212006f no month.

Mares, "Chem. Abstracts", vol. 103, 1985, 186551d no month.

*Primary Examiner*—Jack Cooper
*Attorney, Agent, or Firm*—Marvin Snyder

[57] ABSTRACT

In a computed tomography machine employing a luminescent material in a scintillator in which a significant factor in afterglow is the release of holes from hole traps in the scintillator material, afterglow in the luminescent material is substantially reduced by adding a hole-trapping species to the scintillator composition which successfully competes with the hole traps in the basic scintillator composition. For a gadolinium gallium garnet scintillator activated with chromium, the addition of cerium reduces afterglow in this manner.

7 Claims, 5 Drawing Sheets

FIG. 1

TABLE 1

| WT% Cr$_2$O$_3$ \ WT% ADDITIVE | NONE | Ce = 0.013 | Ce = 0.026 | Ce = 0.038 | Ce = 0.051 | Ce = 0.068 | Ce = 0.10 |
|---|---|---|---|---|---|---|---|
| 0.6 | LO = 0.67V<br>PU = 1.8%<br>AFG = 1.0%<br>RD = 7.3%<br>PS = 140μs | | LO = 0.45V<br>PU = 0.3%<br>AFG = 0.22%<br>RD = -0.5%<br>PS = 155μs | | LO = 0.47V<br>PU = 0.3%<br>AFG = 0.13%<br>RD = -0.5%<br>PS = 140μs | | |
| 0.31 | LO = 0.59V<br>PU = 1.8%<br>AFG = 0.70%<br>RD = 9.4%<br>PS = 150μs | LO = 0.53V<br>PU = 0.4%<br>AFG = 0.27%<br>RD = 0.0%<br>PS = 145μs | LO = 0.58V<br>PU = 0.2%<br>AFG = 0.11%<br>RD = 0.2%<br>PS = 145μs | LO = 0.69V<br>PU = 0.1%<br>AFG = 0.06%<br>RD = 0.8%<br>PS = 155μs | LO = 0.54V<br>PU = 0.0%<br>AFG = 0.03%<br>RD = -0.2%<br>PS = 130μs | LO = 0.49V<br>PU = 0.0%<br>AFG = 0.02%<br>RD = -0.3%<br>PS = 135μs | LO = 0.38V<br>PU = 0.0%<br>AFG = 0.03%<br>RD = 0.09%<br>PS = 130μs |
| 0.15 | | LO = 0.54V<br>PU = 0.8%<br>AFG = 0.30%<br>RD = 1.7%<br>PS = 155μs | LO = 0.53V<br>PU = 0.1%<br>AFG = 0.08%<br>RD = 0.5%<br>PS = 145μs | LO = 0.50V<br>PU = 0.1%<br>AFG = 0.12%<br>RD = 0.0%<br>PS = 155μs | LO = 0.54V<br>PU = 0.1%<br>AFG = 0.09%<br>RD = -0.6%<br>PS = 150μs | LO = LIGHT OUTPUT<br>PU = PUMP UP<br>AFG = AFTER GLOW<br>RD = RADIATION DAMAGE<br>PS = PRIMARY SPEED | |
| 0.10 | | | LO = 0.40V<br>PU = 1.3%<br>AFG = 0.57%<br>RD = 0.48%<br>PS = 150μs | | LO = 0.41V<br>PU = 0.2%<br>AFG = 0.11%<br>RD = -0.3%<br>PS = 130μs | | |

FIG. 1A

TABLE 1A RELATIVE VALUES

| WT% Cr$_2$O$_3$ | NONE | Ce = 0.013 | Ce = 0.026 | Ce = 0.038 | Ce = 0.051 | Ce = 0.068 | Ce = 0.10 |
|---|---|---|---|---|---|---|---|
| 0.6 | LO = 100<br>PU = 100<br>AFG = 100<br>RD = 100<br>PS = 100 | | LO = 67<br>PU = 16<br>AFG = 22<br>RD = -6<br>PS = 110 | | LO = 70<br>PU = 16<br>AFG = 13<br>RD = -6<br>PS = 100 | | |
| 0.31 | LO = 88<br>PU = 100<br>AFG = 70<br>RD = 128<br>PS = 107 | LO = 79<br>PU = 22<br>AFG = 27<br>RD = 0<br>PS = 103 | LO = 86<br>PU = 11<br>AFG = 11<br>RD = 3<br>PS = 103 | LO = 102<br>PU = 5<br>AFG = 6<br>RD = 10<br>PS = 110 | LO = 80<br>PU = 0<br>AFG = 3<br>RD = -3<br>PS = 93 | LO = 73<br>PU = 0<br>AFG = 2<br>RD = -4<br>PS = 96 | LO = 56<br>PU = 0<br>AFG = 3<br>RD = 1<br>PS = 93 |
| 0.15 | | LO = 80<br>PU = 44<br>AFG = 30<br>RD = 23<br>PS = 110 | LO = 79<br>PU = 5<br>AFG = 8<br>RD = 6<br>PS = 103 | LO = 74<br>PU = 5<br>AFG = 12<br>RD = 0<br>PS = 110 | LO = 80<br>PU = 5<br>AFG = 9<br>RD = -8<br>PS = 107 | | |
| 0.10 | | | LO = 59<br>PU = 72<br>AFG = 57<br>RD = 5<br>PS = 107 | | LO = 61<br>PU = 11<br>AFG = 11<br>RD = -4<br>PS = 93 | | |

LO = LIGHT OUTPUT
PU = PUMP UP
AFG = AFTER GLOW
RD = RADIATION DAMAGE
PS = PRIMARY SPEED

FIG. 2

TABLE 2

| WT% Cr$_2$O$_3$ | WT% ADDITIVE |  |  |  |  |  |  |
|---|---|---|---|---|---|---|---|
| | NONE | Tb = 0.009 | Tb = 0.026 | Tb = 0.052 | Pr = 0.026 | Pr = 0.051 | Eu = 0.052 |
| 0.6 | | | | | | | |
| 0.31 | LO = 0.67V<br>PU = 1.8%<br>AFG = 1.0%<br>RD = 7.3%<br>PS = 140μs | LO = 0.66V<br>PU = 1.5%<br>AFG = 0.32%<br>RD = 5.5%<br>PS = 135μs | LO = 0.55V<br>PU = 0.4%<br>AFG = 0.18%<br>RD = 2.1%<br>PS = 160μs | LO = 0.61V<br>PU = 0.7%<br>AFG = 0.36%<br>RD = 3.2%<br>PS = 160μs | LO = 0.58V<br>PU = 1.0%<br>AFG = 0.59%<br>RD = 5.0%<br>PS = 170μs | LO = 0.52V<br>PU = 0.5%<br>AFG = 0.37%<br>RD = 5.1%<br>PS = 165μs | LO = 0.43V<br>PU = 4.3%<br>AFG = 1.96%<br>RD = 14.6%<br>PS = 170μs |
| 0.15 | | | | | | | |
| 0.10 | | | | | | | |

LO = LIGHT OUTPUT
PU = PUMP UP
AFG = AFTER GLOW
RD = RADIATION DAMAGE
PS = PRIMARY SPEED

FIG. 2A

TABLE 2A RELATIVE VALUES

| WT% Cr$_2$O$_3$ | WT% ADDITIVE |  |  |  |  |  |  |  |
|---|---|---|---|---|---|---|---|---|
| | NONE | Tb = 0.009 | Tb = 0.026 | Tb = 0.052 | Pr = 0.026 | Pr = 0.051 | Eu = 0.052 | |
| 0.6 | LO = 100<br>PU = 100<br>AFG = 100<br>RD = 100<br>PS = 100 | | | | | | | |
| 0.31 | | LO = 98<br>PU = 83<br>AFG = 32<br>RD = 75<br>PS = 96 | LO = 82<br>PU = 22<br>AFG = 10<br>RD = 28<br>PS = 114 | LO = 91<br>PU = 39<br>AFG = 36<br>RD = 43<br>PS = 114 | LO = 86<br>PU = 55<br>AFG = 59<br>RD = 68<br>PS = 121 | LO = 77<br>PU = 27<br>AFG = 37<br>RD = 70<br>PS = 117 | LO = 64<br>PU = 238<br>AFG = 196<br>RD = 200<br>PS = 121 | |
| 0.15 | | | | | | | | LO = LIGHT OUTPUT<br>PU = PUMP UP<br>AFG = AFTER GLOW<br>RD = RADIATION DAMAGE<br>PS = PRIMARY SPEED |
| 0.10 | | | | | | | | |

HOLE-TRAP-COMPENSATED SCINTILLATOR FOR COMPUTED TOMOGRAPHY MACHINE

This application is a division, of application Ser. No. 07/960,203, filed Oct. 13. 1992 which is a continuation of application Ser. No. 07/546,824, filed Jun. 29, 1990, now abandoned.

RELATED APPLICATIONS

This application is related to application Ser. No. 07/547,007, filed Jun. 29, 1990, now U.S. Pat. No. 5,057,692, issued Oct. 15, 1991, entitled "High Speed, Radiation Tolerant, CT Scintillator System Employing Garnet Structure Scintillators" by C. D. Greskovich et al. and application Ser. No. 07/547,006 filed Jun. 29, 1990, entitled "Transparent Polycrystalline Garnets" by C. D. Greskovich et al., each of which is being filed concurrently herewith and is incorporated herein by reference in its entirety.

BACKGROUND OF THE INVENTION

1. Field of the Invention

The present invention relates to the field of solid state scintillators for computed tomography machines, and more particularly, to the field of high speed solid state scintillators.

2. Background Information

A luminescent material absorbs energy in one portion of the electromagnetic spectrum and emits energy in another portion of the electromagnetic spectrum. A luminescent material in powder form is commonly called a phosphor, while a luminescent material in the form of a transparent solid body is commonly called a scintillator.

Most useful phosphors emit radiation in the visible portion of the spectrum in response to the absorption of the radiation which is outside the visible portion of the spectrum. Thus, the phosphor performs the function of converting electromagnetic radiation to which the human eye is not sensitive into electromagnetic radiation to which the human eye is sensitive. Most phosphors are responsive to more energetic portions of the electromagnetic spectrum than the visible portion of the spectrum. Thus, there are powder phosphors which are responsive to ultraviolet light (as in fluorescent lamps), electrons (as in cathode ray tubes) and x-rays (as in radiography).

Two broad classes of luminescent materials are recognized. These are self-activated luminescent materials and impurity-activated luminescent materials.

A self-activated luminescent material is one in which the pure crystalline host material upon absorption of a high energy photon elevates electrons to an excited state from which they return to a lower energy state by emitting a photon. Self-activated luminescent materials normally have a broad spectrum emission pattern because of the relatively wide range of energies which the electron may have in either the excited or the lower energy states with the result that any given excited electron may emit a fairly wide range of energy during its transition from its excited to its lower energy state, depending on the particular energies it has before and after its emissive transition.

An impurity activated luminescent material is normally one in which a non-luminescent host material has been modified by inclusion of an activator species which is present in the host material in a relatively low concentration such as in the range from about 200 parts per million (ppm) to about 1,000 ppm. However, some phosphors require several mole percent of activator ions for optimized light output. With an impurity activated luminescent material, the host crystal absorbs the incident photon and the absorbed energy may be accommodated by the activator ions or it may be transferred by the lattice to the activator ions. One or more electrons of the activator ions are raised to a more excited state. These electrons, in returning to their less excited state, emit a photon of luminescent light. In many commonly employed impurity activated luminescent materials, the electrons which emit the luminescent light are d or f shell electrons whose energy levels may be significantly affected or relatively unaffected, respectively, by the surrounding crystal field. In those situations where the activator ion is not much affected by the local crystal field, the emitted luminescent light is substantially characteristic of the activator ions rather than the host material and the luminescent spectrum comprises one or more relatively narrow emission peaks. This contrasts with a self-activated luminescent material's much broader emission spectrum. In those situations where the electron energies of the activator ions are significantly affected by the crystal structure, the luminescent spectrum is normally a fairly broad one similar to that of a self-activated luminescent material. The host material of an impurity activated luminescent material normally has many other uses in which no activating species is present. In some of those uses, that host material may include other species to modify its properties, and may even include constituents which are luminescent activators, but which are included in the composition because of non-luminescent characteristics which they impart to that composition.

There are a vast number of known phosphors each of which has its own set of properties such as the turn-on delay, efficiency, primary decay time, afterglow, hysteresis, luminescent spectrum, radiation damage and so forth. The turn-on delay of a luminescent material is the time period between the initial impingement of stimulating radiation on the luminescent material and the luminescent output reaching its maximum value, for a constant intensity of stimulating radiation. The efficiency of a luminescent material is the percentage of the energy of the absorbed stimulating radiation which is emitted as luminescent light. When the stimulating radiation is terminated, the luminescent output from a scintillator decreases in two stages. The first of these stages is a rapid decay from the full luminescent output to a low, but normally non-zero, value at which the slope of the decay changes to a substantially slower decay rate. This low intensity, normally long decay time luminescence, is known as afterglow and usually occurs with intensity values less than 2% of the full intensity value. The initial, rapid decay is known as the primary decay or primary speed and is measured from the time at which the stimulating radiation ceases to the time at which the luminescent output falls to 1/e of its full intensity value.

A luminescent material exhibits hysteresis if the amount of luminescent light output for a given amount of incident stimulating radiation depends upon the amount of stimulating radiation which has been recently absorbed by the luminescent material. The luminescent spectrum of a luminescent material is the spectral characteristics of the luminescent light which is emitted by that material.

Radiation damage is the characteristic of a luminescent material in which the quantity of light emitted by the luminescent material in response to a given intensity of stimulating radiation changes after the material has been exposed to a high radiation dose. Radiation damage may be measured by first stimulating a luminescent material with a known, standard or reference, intensity of radiation. The initial output ($I_o$) of the photodetector in response to this reference intensity of incident stimulating radiation is measured and recorded or stored. Next, the luminescent material is exposed to a high dosage of radiation. Finally, the luminescent material is immediately again exposed to the reference intensity of stimulating radiation and the final output ($I_f$) of its photodetector, in response to this reference intensity of stimulating radiation, is measured and stored or recorded. The radiation damage (RD) may then be expressed as:

$$RD = \frac{I_f - I_o}{I_o} \qquad (1)$$

Ideally, the radiation damage should be as small as possible. In most luminescent materials, it is a negative number because $I_f$ is normally less than $I_o$. However, if the afterglow magnitude is $\geq 0.1\%$ at $\sim 100$ milliseconds after cessation of x-radiation, then unreliable and positive numbers for radiation damage may be obtained.

In phosphors for use in radiography, many of these characteristics can vary over a wide range without adversely affecting overall system performance. In other applications, each of these characteristics must be strictly specified to obtain maximum or practical performance.

In a computed tomography (CT) scanning system, an x-ray source and an x-ray detector array are positioned on opposite sides of the subject and rotated around the subject in fixed relation to each other. Early CT scanning systems employed xenon gas as their x-ray detection medium. In these systems, incident x-rays ionize the xenon gas and the resulting ions are attracted to charged plates at the edge of the cell and the scintillator output is a charge or current. More recently, CT scanners with solid scintillators have been introduced. In a solid scintillator system, the scintillator material of a cell or element absorbs x-rays incident on that cell and emits light which is collected by a photodetector for that cell. During data collection, each cell or element of the detector array provides an output signal representative of the present light intensity in that cell of the array. These output signals are processed to create an image of the subject in a manner which is well known in the CT scanner art. It is desirable for the luminescent material in a CT scanner to have a linear characteristic in which the light output is a linear function of the amount of stimulating radiation which is absorbed in order that light output may be directly converted to a corresponding intensity of stimulating radiation in a linear manner.

In systems such as CT scanners, the luminescent material must have many specialized characteristics which are not needed in many of the previously mentioned phosphor based systems. First, in x-ray based CT systems, it is desirable to absorb substantially all of the incident x-rays in the luminescent material in order to minimize the x-ray dose to which the patient must be exposed in order to obtain the computed tomography image. In order to collect substantially all of the incident x-rays, the luminescent material must have a thickness in the direction of x-ray travel which is sufficient to stop substantially all of the x-rays. This thickness depends both on the energy of the x-rays and on the x-ray stopping power of the luminescent material. Second, it is important that substantially all of the luminescent light be collected by the photosensitive detector in order to maximize overall system efficiency, the signal to noise ratio and the accuracy with which the quantity of incident stimulating radiation may be measured. In order to extract substantially all of the luminescent light generated in the luminescent material of the CT scanner, the luminescent material should be transparent to the luminescent light. Otherwise much of the luminescent light will not reach the photosensitive detector because of scattering and absorption within the luminescent material. Consequently, the luminescent material is provided in the form of a solid bar which is substantially transparent to the luminescent light and which is thick enough in the direction of x-ray travel to absorb substantially all of the incident x-rays. This complicates both the selection of a luminescent material for use in CT scanning and its preparation since many materials which are known to luminesce and which have been used or tested as powder phosphors cannot be provided in the form of a solid bar having the necessary transparency.

The luminescent properties of materials have not been tabulated in handbooks in the manner in which the melting point, boiling point, density and other more mundane physical characteristics of various compounds have been tabulated. Most luminescent data is found in articles with respect to particular materials which the authors have measured for one reason or another. Further, most characterization of luminescent materials has been done using ultraviolet (UV) light as the stimulating radiation because ultraviolet light is more easily produced than x-rays and is generally considered less harmful. Unfortunately, there are a number of materials which are luminescent in response to ultraviolet light stimulation which are not luminescent in response to x-ray stimulation. Consequently, for many materials, even that luminescent data which is available provides no assurance that the material will luminesce in response to x-ray stimulation. Further, for many applications of phosphors many of the parameters which must be closely controlled in a scintillator for use in a state-of-the-art CT scanning system are unimportant and thus have not been measured or reported. Consequently, existing luminescent material data provides little, if any, guidance in the search for a scintillator material appropriate for use in a state-of-the-art CT scanning system. Among the parameters on which data is generally unavailable are radiation damage in response to x-ray stimulation, afterglow, susceptibility to production in single crystalline form, hysteresis phenomena, mechanical quality and in many cases, even whether they are x-ray luminescent. The large number of parameters which must meet strict specifications in order for a given material to be suitable for use in a state-of-the-art CT scanner, including the ability to provide the material in the form of transparent scintillator bodies, makes the process of identifying a suitable scintillator material one which essentially begins from scratch and is akin to searching for "a needle in a haystack". The difficulty of identifying such a material is exemplified by the use of cadmium tungstate and cesium iodide activated with thallium in CT scanning machines presently being marketed despite the fact that each of these materials has a number of characteristics (discussed below) which are considered undesirable for a state-of-the-art CT scanner scintillator.

There are several reasons that it is desirable that the radiation damage be as small as possible. One disadvantage of high radiation damage is that as radiation damage accumulates, the sensitivity of the system decreases because of the progressively smaller quantity of light which is emitted by the scintillator material for a given stimulating dosage of radiation. Another disadvantage is that for too high a radiation damage, the scintillation detectors must eventually be replaced because of the cumulative effects of the radiation damage. This results in a substantial capital cost for the replacement of the scintillation detecting system. A more bothersome, and potentially even more expensive effect of high radiation damage is a need to recalibrate the system frequently during the working day, and potentially as frequently as after every patient. Such recalibration takes time and also exposes the scintillator material to additional radiation which contributes further damage. It is considered desirable that the radiation damage of a scintillator material for use in a CT scanning system be small enough that calibration of the system at the beginning of each working day is sufficient to ensure accurate results throughout the working day.

One way of providing the luminescent material in the form of a transparent bar is to employ a single crystalline luminescent material which is transparent to its own luminescent radiation. A common method of growing single crystals is the Czochralski growth technique in which appropriate source materials are placed in a high temperature crucible which is often made of iridium (Ir) and the crucible and its contents are heated to above the melting point of the desired single crystalline material. The resulting molten material is known as the melt. During growth, the melt temperature is held at a value at which the upper portion of the melt is cool enough for single crystalline material to grow on a seed crystal brought into contact with the melt, but not to spontaneously nucleate. A seed crystal of the desired material or one on which the desired material will grow as a single crystal is lowered into contact with the top of the melt. As the desired crystalline material grows on the seed crystal, the seed crystal is withdrawn (pulled upward) at a rate which maintains the growing boule of single crystalline material at a desired diameter. Typically, the seed crystal is rotated during growth to enhance the uniformity of the growing crystal. The source material which is initially placed in the crucible may take any appropriate form, but is normally a mixture of appropriate quantities of source materials which together provide a melt having the stoichiometry desired for the single crystalline material to be grown.

When a pure crystal is grown from a corresponding melt, the Czochralski growth technique normally provides a high quality, uniform composition single crystal of the desired composition. When it is desired to produce a crystal having substitutions for some portion of the atoms of the pure crystalline material, the growth dynamics are more complex and the manner in which the substituent enters into the crystal structure and thus its concentration in the melt and boule as functions of time depend on a number of characteristics. One of the effects of these characteristics is characterized as the segregation coefficient. The segregation coefficient has a value of 1 when the substituent is normally present in the solid boule in the same ratio as it is present in the source melt. The segregation coefficient is greater than 1 when the substituent is normally present in the solid boule in greater concentration than it is present in the source melt and the segregation coefficient is less than 1 when the substituent is normally present in the solid boule in lesser concentrations than it is present in the melt. While there are a number of different fundamental reasons for these differences, the segregation coefficient is an effective means of expressing the result.

Where slabs or bars of the single crystalline material are desired, the Czochralski-grown single crystalline boule is sliced into wafers and then into bars of the desired configuration. The only two single crystalline luminescent materials known to be in use in commercial CT scanning systems are cesium iodide (CsI) and cadmium tungstate ($CdWO_4$). The cesium iodide is thallium (Tl) activated while the cadmium tungstate is a pure, self-activated luminescent material. CsI produces a luminescence output having a peak emission at about 550 nm and exhibits appreciable hysteresis and radiation damage. $CdWO_4$ produces a luminescence output having a peak at about 540 nm and exhibits high radiation damage, although to a lesser extent than CsI. The radiation damage with CsI is severe enough, that recalibration of the system between patients is often desirable. While the radiation damage in $CdWO_4$ is less than that, recalibration more than once a day is considered desirable. As a consequence of these radiation damage characteristics, systems which employ either of these materials as their scintillating material suffer from a decrease in sensitivity as radiation damage accumulates and must eventually have their scintillator system replaced.

In a CT scanning system, one of the crucial characteristics of a scintillator bar is its Z-axis response curves. Individual scintillator bars are normally narrow for maximum resolution and deeper than wide to provide adequate x-ray stopping power and relatively long perpendicular to the plane of the x-ray beam/scintillator system in order to collect sufficient x-rays to be efficient. The Z-axis characteristic is the photodetector output in response to a constant intensity, narrow, x-ray stimulating beam as that beam is scanned from one Z-direction end of the scintillator bar to the other. Ideally, this characteristic is symmetric about the longitudinal center of the scintillator bar and increases monotonically from each end to the center. The increase in output near the ends of the bar is preferably complete once the entire Z-direction thickness of the beam is disposed on the scintillator bar, with the output being substantially uniform along the intervening portion of the bar.

In order to meet these Z-axis requirements, the scintillator bar must have substantially uniform optical, luminescent and source radiation absorption properties along its entire length. For single crystal, impurity-activated scintillator bars, this requires the ability to grow source boules having uniform luminescent activator concentration both radially and lengthwise of the boule, since the luminescent output is dependent on the local concentration of the activator ion. Consequently, the process of selecting a scintillator material for a CT scanner, in addition to determining all of the other important properties of the material, must also include establishing the feasibility of producing scintillator bars with acceptable Z-axis characteristics.

In a CT scanner, it is preferable to provide a reflective surface on all surfaces of the scintillator bar other than the surface along which the photodetector diode is disposed. Thus, a typical solid scintillation detector system comprises a plurality of individual scintillator bars positioned side-by-side with an individual photodetector diode coupled to each scintillator bar to convert its luminescent light into a corresponding electrical signal. It is important in such a system that all of the scintillator bars have similar overall conversion efficiencies (that is, substantially identical electrical output signals for identical incident x-ray radiation). This places another limitation on the selection of the scintillator material in that it must be possible to produce a sufficient quantity of scintillator bars having similar characteristics to assemble a scintillation detector having as many as 1,000 or more elements.

The primary decay time determines how fast a CT scanner can scan a patient since it is necessary for the luminescent output in response to radiation incident in one position of the scanner to have ceased before the luminescent output at another position of the scanner can be accurately measured. At present, a primary decay time of less than 500 microseconds is preferred, with still lower values being more desirable if they can be obtained without undesirable affects on other properties of the scintillator material such as maximum light output, radiation damage and hysteresis. It is also desirable that the maximum afterglow level be very small and that it decay relatively rapidly. For modern CT scanners, afterglow may be measured at 100 to 150 milliseconds after stimulating radiation termination and again at 300 milliseconds to characterize a scintillator material. An afterglow of less than 0.1% is considered highly desirable since the photodetector cannot distinguish between luminescent light which is a result of afterglow from earlier stimulation and luminescent light which is a result of present stimulation. Thus, afterglow can limit the intensity resolution of a CT scanner system.

For purposes of comparing the efficiency of different candidate scintillator materials, it is convenient to normalize light output. The amplitude of the output signal from a photodetector diode in response to stimulation of a standard sized scintillator bar of the candidate material with an established reference intensity of x-rays is compared with the output produced by cadmium tungstate of the same configuration in response to the same stimulation. Cadmium tungstate is a convenient standard because the self-activated nature of its luminescence results in substantially fixed light output for a given intensity of stimulating radiation so long as it has not been heavily radiation damaged, since its light output does not depend on the concentration of an activator. Thus, light output data taken by different individuals and at different times can be directly compared without having to first establish the calibration of different test setups.

It is desirable to have computed tomography scanning systems operate as fast as possible to maximize the number of patients which can be examined by a computed tomography scanner each working day and because the shorter time a scan takes, the easier it is for a patient to hold still during the scan. Further, the movement of internal organs is minimized.

As the scanning speed of a CT system is increased, the signal amplitude decreases for a fixed x-ray dose rate. Consequently, the signal-to-noise ratio, the contrast and thus the useful intensity resolution will decrease unless system parameters are adjusted to reduce noise. In order to reduce noise, the primary decay time of the scintillator should be reduced to a value where it does not contribute noise to the system. The afterglow should also be reduced as much as possible, since it provides a background luminescence intensity which is a noise contribution to the photodetector output. Selecting a scintillator material having its peak output in the vicinity of the peak sensitivity of the photodetector has the effect of reducing noise by increasing signal amplitude. Other modifications can also assist in maintaining the signal-to-noise ratio.

As the CT scanner field has matured, the speed of the electronics has increased, thus making faster scintillators desirable in order that a data scan may be performed in less time. It is now desired to operate CT scanning systems at speeds which require scintillators which are much faster than what was required as little as five years ago. Consequently, there is a vast lack of data about known solid luminescent materials which would be needed in order to select and make a scintillator material which is appropriate for use in a state-of-the-art CT scanning system where high speed electronics must be matched by a still higher speed scintillation material.

Separate from the problem of determining all these characteristics for individual candidate materials, is the problem that in a scintillation scanner, material must be provided in the form of a transparent solid body. Many luminescent materials which can be provided in powder form cannot be provided in a single crystalline form and thus are not available as transparent bodies. This inability to produce particular luminescent materials as single crystalline material can be a result of incompatibility of crystal structures, instability at Czochralski growth temperatures, low solubility of some components of a luminescent material in the crystal structure or the melt, a segregation coefficient which results in a non-uniform distribution within the boule of the additives and/or substituent or other reasons. Consequently, even if a particular luminescent composition is identified as apparently having desirable properties for use in a scintillation detector of a computed tomography machine, production of such a scintillator detector is not straightforward. In many cases, the desired composition cannot be produced as a single crystalline material.

Scintillation counters are used to count high energy particles, in physics research. These scintillation counters normally comprise a solid transparent body (often a plastic with a luminescent material dispersed in it) which is coupled to a photomultiplier tube to detect the very faint luminescence produced by absorption of a single particle. The materials used for such scintillation counters must have a very short primary decay time (preferably much less than 100 nanoseconds) in order to distinguish separate, but closely spaced-in-time events from each other in order that the desired counting may take place. The other characteristics which are important to the use of a material as the scintillator in a CT scanning system are of little consequence in the scintillation counter art so long as the afterglow is low enough that a new primary scintillation can be distinguished from any background afterglow resulting from previous events. These scintillation counters can use luminescent materials whose afterglow would present a problem in the CT scanning art. Consequently, although work has been done on scintillation materials for use in scintillation counting applications, such work is only peripherally relevant to a search for a scintillation material for use in a CT scanning system.

There are a number of luminescent materials which can be produced by flux growth techniques as small single crystals, but which cannot be produced as large single crystals because they are unstable at high temperatures and decompose into constituent materials. Other luminescent materials have been produced as thin films in attempts to develop phosphors for projection cathode ray tubes in order to minimize light loss due to scattering in amorphous or polycrystalline films. Such materials have no utility for the scintillators of CT scanners in the absence of an ability to provide a transparent body having sufficient thickness (generally at least 1 mm thick) for the material to be effective at stopping the x-rays employed in a CT scanning system. Further, the reports of the development work done on these materials contain no data on many characteristics which are crucial to determining whether a material is suitable for use in a CT scanning system.

A polycrystalline alternative to the single crystalline scintillator materials cesium iodide and cadmium tungstate is disclosed in U.S. Pat. Nos. 4,421,671; 4,466,929; 4,466,930; 4,473,413; 4,518,545; 4,518,546; 4,525,628; 4,571,312; 4,747,973 and 4,783,596. The scintillator composition disclosed in these patents is a cubic yttrium gadolinium oxide doped with various rare earth elements to provide a scintillator material having desired luminescent properties. These materials have not been prepared in single crystalline form because of the difficulty of growing crystals with desired, uniform distribution of all of the necessary constituents. As is further disclosed in the above recited patents, a method was developed for providing this doped yttrium-gadolinium oxide scintillator material in a polycrystalline ceramic form in which it is sufficiently transparent to provide an excellent scintillator material. This material has the substantial advantage over the cesium iodide and cadmium tungstate of being essentially free of radiation damage and hysteresis as well as having a sufficiently low afterglow to satisfy the requirements for a high quality CT scanning system. Unfortunately, this material has a primary decay time on the order of 1,000 microseconds and thus is not as fast as is desired for present state-of-the-art CT scanning systems.

German patent DE 37 04 813 A1 describes a single crystal $Gd_{3-x}Ce_xAl_{5-y}Sc_yO_{12}$ scintillator prepared either by first spray drying a source sulfate solution and calcining the dried sulfate or mixing oxides—each followed by pressing, sintering, melting and pulling a single crystal in a high vacuum. A spectrum for the luminescent output from this material is also presented with its peak in the vicinity of 560 nm.

It would be desirable to have a scintillator which is fast, has a low afterglow, no hysteresis, no non-linearity in output, high x-ray stopping power, high light output for a given stimulating x-ray input and which emits light at a frequency where photodetector diodes are particularly sensitive.

Single crystalline yttrium aluminum garnet (YAG) doped with neodymium is a known laser material. This material has also been further doped with chromium to increase the absorbence of the light frequency used to optically pump a YAG laser. While attempts have been made to produce transparent polycrystalline YAG, such attempts have not been successful, see for example, "Translucent $Y_3Al_5O_{12}$ Ceramics", G. de With et al., Materials Research Bulletin, Vol. 19, p. 1669–1674, 1984. Reduced opacity or increased translucency or transparency has been reported in sintered YAG where magnesium oxide or silicon dioxide was included in the composition in a concentration of 500–2,000 ppm. However, even with this addition, true transparency is not obtained. Further, the inclusion of such transparency promoters in a scintillator material would be undesirable because of the potential for these impurities to adversely effect one or more of the desirable properties of a scintillator material.

Many garnets are transparent in the infrared region. Consequently, transparent ceramic garnets would be desirable for use as combined visible/infrared windows where true transparency was obtained throughout this portion of the spectrum.

The particular compositions discussed in the two related applications Ser. No. 07/547,007 now U.S. Pat. No. 5,057,692 "High Speed, Radiation Tolerant, CT Scintillator System Employing Garnet Structure Scintillators" and 07/547,006 "Transparent Polycrystalline Garnets" in general have desirable characteristics for luminescent materials for use in CT scanning and other short response time systems, but exhibit afterglow which is greater than desired.

It is known in the luminescent scintillator art that afterglow can be affected by impurities present in the scintillator composition. In some cases, afterglow is increased by the presence of impurities, and in other cases, afterglow is decreased by the presence of impurities. It would be desirable to be able to predict what effect a particular impurity would have on afterglow. However, the particular mechanisms which control afterglow have not been well understood with the result that afterglow reduction in a particular luminescent material has been a trial and error process of adding selected impurities to the luminescent composition and then measuring the resultant effect. Thus, the goal of predictability has eluded the art even though trial and error experiments have in some cases determined both the utility of a particular impurity or combination of impurities for afterglow reduction purposes and the quantity or concentration in which that impurity should be introduced into the host composition in order to have a desirable afterglow reduction effect without significant adverse effects on other important properties of the luminescent material for the particular intended use.

With single crystalline luminescent materials of the general type in which a host crystalline composition is non-luminescent and to which a luminescent activator is added, there is a significant problem with determining what impurities are present, and more particularly, in attempting to selectively introduce additional impurities, to determine whether they have a beneficial effect on the luminescent properties of that material. The addition problem, as explained in related application Ser. No. 07/547,006, "Transparent Polycrystalline Garnets", is acute because of the difficulty of independently controlling the quantity of a luminescent activator and a selected additional additive in a single crystalline material which is grown by the Czochralski growth technique. Consequently, the field of controlling the luminescent material's response characteristics by the addition of additional dopants or additives has not been a fruitful area for research with single crystalline luminescent materials. With luminescent materials intended for use as scintillators, the requirement for uniform transparency and composition has been a substantial stumbling block to the development and testing of multiple additive luminescent compositions.

As discussed in related application Ser. No. 07/547,006, "Transparent Polycrystalline Garnets", we have developed a technique for producing transparent polycrystalline garnet scintillator bodies in which the composition can be closely controlled as a result of the method of preparation. This opens up the possibility of extensive trial and error testing of different additives to see whether they may have a beneficial effect on the luminescent properties of the desired composition.

Accordingly, there is a need for a better understanding of both afterglow production and afterglow suppression mechanisms within luminescent materials in order to facilitate the design and testing of luminescent compositions and for luminescent compositions which exhibit reduced afterglow without substantial deterioration of other luminescent properties.

OBJECTS OF THE INVENTION

Accordingly, a primary object of the present invention is to provide an understanding of afterglow creation mechanism which facilitates predictable afterglow reduction.

Another object of the present invention is to significantly reduce afterglow in garnet luminescent materials without introducing a significant adverse effect on other luminescent properties of the garnet material.

Another object of the present invention is to reduce afterglow in a chromium doped gadolinium gallium garnet luminescent material employed as a scintillator for a computed tomography machine.

Another object of the present invention is to reduce afterglow in a chromium doped gadolinium or gallium based garnet luminescent material employed as a scintillator for a computed tomography machine.

SUMMARY OF THE INVENTION

The above and other objects which will become apparent from the specification as a whole, including the drawings, are accomplished in accordance with the present invention with an enhanced scintillator having a basic crystalline scintillator composition which has a garnet structure and exhibits afterglow which is at least partially a result of radiative recombination of holes which are released from traps after the cessation of stimulation to which a hole trapping species has been added, in order to counteract the afterglow-inducing effect of hole traps in the basic scintillator composition.

This is particularly applicable to impurity-activated garnet compositions which exhibit hole-trapping induced afterglow. Garnets of interest include gadolinium gallium garnet ($Gd_3Ga_5O_{12}$), gadolinium scandium gallium garnet ($Gd_3Sc_2Ga_3O_{12}$), gadolinium scandium aluminum garnet ($Gd_3Sc_2Al_3O_{12}$), each activated with chromium 3+ ions in a concentrations from about 0.07 to 0.2 wt % $Cr_2O_3$, yttrium aluminum garnet ($Y_3Al_5O_{12}$) activated with cerium 3+ ions at a concentration of about 0.33 wt % $Ce_2O_3$ or neodymium 3+ ions at a concentration of about 0.85 wt % $Nd_2O_3$ are particular examples of such scintillator compositions. For simplicity, we shall denote $Gd_3Ga_5O_{12}$ as GGG, $Gd_3Sc_2Ga_3O_{12}$ as GSGG, $Gd_3Sc_2Al_3O_{12}$ as GSAG and $Y_3Al_5O_{12}$ as YAG. The most useful composition range for these materials as transparent scintillators is their solid solution garnet structure range of composition of the nominal compositions and includes partial substitutions which do not adversely affect their luminescent properties.

Each of these garnets exhibits relatively low afterglow, but would be more suitable for some applications such as fast CT scanners if it exhibited lower afterglow. We have found that in $Cr^{3+}$ activated gadolinium gallium garnet, the addition of up to 0.10 or more weight percent cerium in the form of an oxide reduces afterglow by as much as 97% with light output reductions in the best cases of as little as 20%, while terbium and praseodymium additions reduce afterglow by factors of up to 10 and almost 3, respectively, with light output reductions of less than 25%.

The afterglow reduction is accompanied by a significant reduction in radiation damage.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 1 and 2 are tables (Tables 1 and 2) illustrating light output, pump-up, afterglow, radiation damage and primary speed of the luminescence for a number of GGG compositions as a function of their composition;

FIGS. 1A and 2A are tables (Tables 1A and 2A) which present the same data as FIGS. 1 and 2, respectively, but with normalized values.

DETAILED DESCRIPTION

Figure 3:
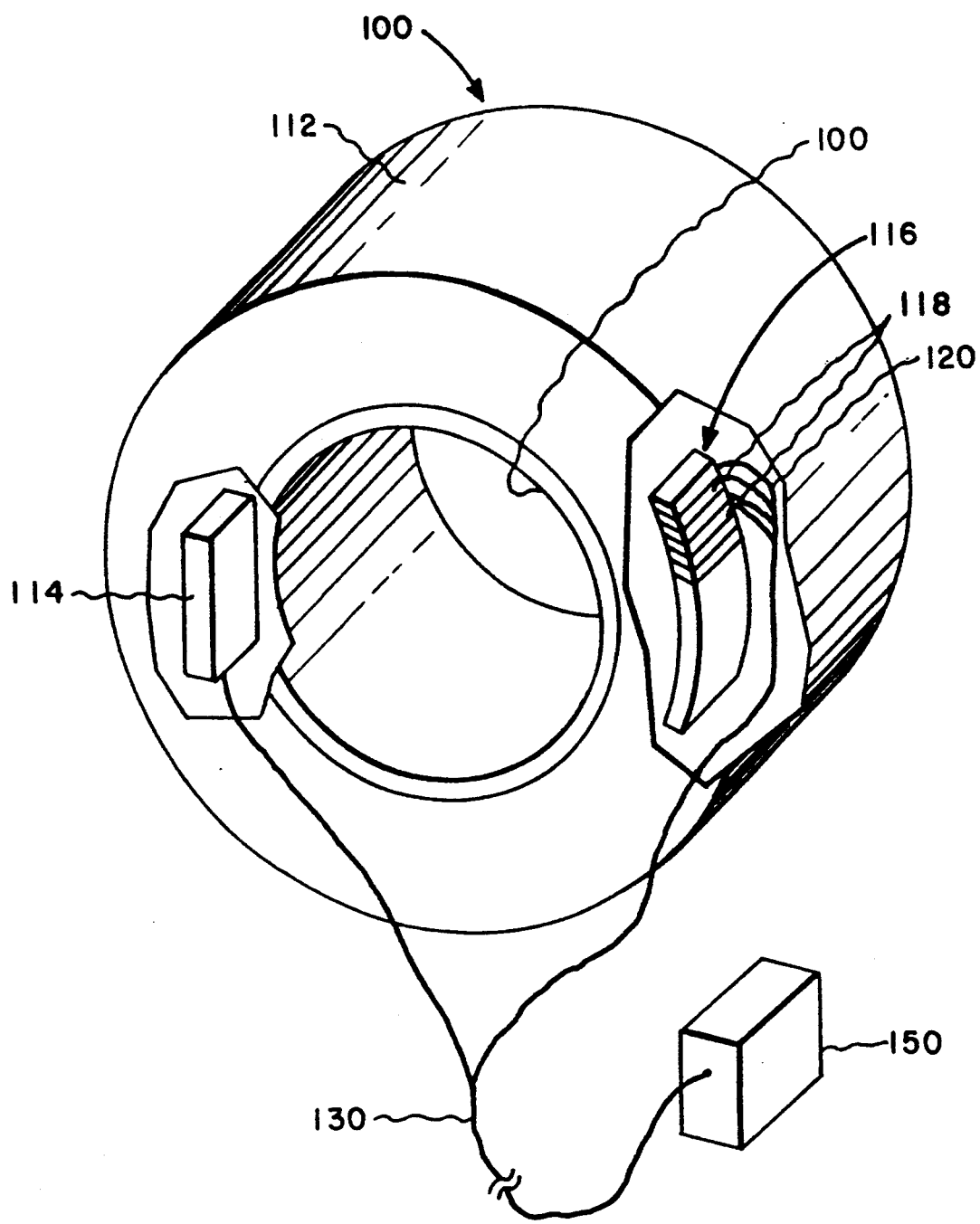
FIG. 3 is a stylized perspective illustration of a portion of a CT machine.

A computed tomography (CT) scanning system 100 is illustrated schematically in FIG. 3. This CT scanning system 100 comprises a cylindrical enclosure 110 in which the patient or object to be scanned is positioned. A gantry 112 surrounds the cylinder 110 and is configured for rotation about the cylinder's axis. The gantry 112 may be designed to revolve for one full revolution and then return or may be designed for continuous rotation, depending on the system used to connect the electronics on the gantry to the rest of the system. The electronics on the gantry include an x-ray source 114 which preferably produces a fan x-ray beam which encompasses a scintillation detector system 116 mounted on the gantry on the opposite side of the cylinder 110. The fan pattern of the x-ray source is disposed in the plane defined by the x-ray source and the scintillation detector system 116. The scintillation detector system 116 is very narrow or thin in the direction perpendicular to the plane of the x-ray fan beam. Each cell 118 of the scintillation detector system incorporates a solid transparent bar of scintillator material and a photodetector diode optically coupled to that scintillator bar. The output from each photodetector diode is connected to an operational amplifier which is mounted on the gantry. The output from each operational amplifier is connected either by individual wires 120 or by other electronics to the main control system 150 for the computed tomography system. In the illustrated embodiment, power for the x-ray source and signals from the scintillation detector are carried to the main control system 150 by a cable 130. The use of the cable 130 generally limits the gantry to a single full revolution before returning to its original position. Alternatively, slip rings or optical or radio transmission may be used to connect the gantry electronics to the main control system 150 where continuous rotation of the gantry is desired. In CT scanning systems of this type, the scintillator material is used to convert incident x-rays to luminescent light which is detected by the photodetector diode and thereby converted to an electrical signal as a means of converting the incident x-rays to electrical signals which may be processed for image extraction and other purposes. At present, one of the limitations on the capabilities of such systems is the characteristics of the scintillator compositions, whether they be xenon gas or bars of solid scintillator material.

A class of luminescent materials which are appropriate for use as scintillators in high speed x-ray CT scanning systems of the type illustrated in FIG. 3 has been identified in the related application Ser. No. 07/547,007, now U.S. Pat. No. 5,057,692 "High Speed, Radiation Tolerant, CT Scintillator System Employing Garnet Structure Scintillators". In particular, in single crystalline form, they luminesce in response to x-ray stimulation, have primary decay times of less than 500 microseconds and have afterglow levels which vary with position in the boule and range from more than 1% to about 0.1% at 100 to 300 milliseconds after the cessation of x-ray stimulating radiation, exhibit radiation damage having a magnitude of less than 5% after an exposure to between 500 and 1,000 rads of ~140 kV x-rays, exhibit essentially no hysteresis and when grown as single crystals by the Czochralski technique, are reasonably transparent to their luminescent light and typically have light outputs which range from about 100% to about 350% of that produced by cadmium tungstate single crystal, a material used in commercial x-ray body scanners.

Preparation of these materials in polycrystalline form is disclosed in related application Ser. No. 07/547,006 entitled "Transparent Polycrystalline Garnets".

This class of scintillator material is based on impurity activated luminescence of cubic garnet crystals. Garnets are a class of materials with the crystal chemical formula $A_3B_5O_{12}$ in which the A cations are eight-coordinated with oxygens and the B cations are either octahedrally (six) or tetrahedrally (four) coordinated with oxygens. The crystal structure is cubic with 160 ions per unit cell containing eight formula units. In accordance with the present invention, the A cat ions are rare earth or yttrium ions alone, in combinations and/or with activator substitutions. The B cat ions may be rare earth ions or other ions, again, alone, in combinations and/or with substitutions. In particular, we have found that with activator ions substituted in the eight-coordinated or six-coordinated sites, these garnets are luminescent in response to x-ray stimulation. A particularly important activator ion which emits x-ray excited optical luminescence in this host material is the chromium 3+ ion located in six-coordinated sites.

As discussed above, a number of the garnet luminescent scintillator materials disclosed in the related applications exhibit promising luminescent properties for use as high speed scintillator materials. However, their afterglow is higher than is considered optimum. In accordance with prior art practice, we could have attempted to improve the afterglow of these materials by a trial and error process of adding impurities (which in this situation would be called afterglow reducers) in a trial and error attempt to find additives which reduce the afterglow of these materials without substantially worsening other characteristics of the luminescent scintillator material. However, such a trial and error process is both expensive and time consuming where a number of luminescent materials are of interest. Consequently, we undertook to understand the process involved in the afterglow in order to devise a systematic means of reducing the afterglow in a predictable manner and thereby avoiding the time and expense of extensive trial and error testing.

When a high energy photon such as x-rays or particles such a neutrons or alpha particles are absorbed in a scintillator, that high energy photon or particle ejects electrons from their atomic orbitals thereby forming hole-electron pairs in which a mobile electron and a mobile hole (positive charge due to the absence of an electron) which are separated from each other and move independently from each other. Hole-electron pairs can recombine giving off energy within the bulk of the material, but in a luminescent scintillator more frequently recombine at activator sites. Holes and electrons are each susceptible to being held at crystalline defects or impurities which exhibit a favorable charge configuration—these sites are known as traps, with hole traps holding holes and electron traps holding electrons. Holes and electrons are each released from traps after a time which depends on the thermallization rate for that particular type of trap.

Crystalline yttrium aluminum garnet (YAG) contains host, hole-trapping, localized energy levels due to intrinsic and extrinsic defects and is weakly luminescent. We theorize that when doped with an individual trivalent activator such as the rare earths cerium, europium, gadolinium and terbium in an attempt to increase its luminescence, these intrinsic and extrinsic host defects remain substantially unchanged and therefore compete with the activator ions for the high energy carriers which provide the energy for luminescence when they transfer their energy to an activator ion. Thus, these defects limit luminescent efficiency and normally contribute to afterglow. This has been concluded from the study of the temperature dependence of the luminescence intensity of the undoped and single rare earth activated YAG. In response to electron beam excitation, YAG doped with $Eu^{3+}$ ($Eu^{3+}$ in YAG is an electron trap) has a good light output, but it also has a high afterglow. The luminescence intensity of YAG doped with Ce increases linearly with Ce concentration at low temperatures consistent with the assumption that the $Ce^{3+}$ ions act as stable hole traps in direct competition with the YAG hole traps. The nature of the impurity potential that the rare earth impurities introduce in YAG (electron attractive or hole attractive potential) is influenced by the electronic configuration (redox properties) of the particular rare earth. For example, $Eu^{3+}$ with the electronic configuration $4f^6$ has one electron less than a half-filled shell and can relatively easily be reduced to $Eu^{2+}$ by attracting an electron. $Ce^{3+}$, on the other hand, has one electron more than a completely filled shell and can attract a hole to form a $Ce^{4+}$ center or species. The fact that Pr also shows a tetravalent state ($Pr^{4+}$) indicates that $Pr^{3+}$ should also form a hole attractive center. The ratio $\{Ln^{3+}\}/[Ln^{4+}]$ depends on the presence of aliovalent impurities in the crystal as well as heat treatment atmosphere, time and temperature. "Ln" in the previous sentence stands for any of the Lanthanide series of the rare earth elements. Aliovalent impurities are those impurities which exhibit a different valence than the element for which they are substituted.

Polycrystalline GGG:Cr as disclosed in Application Ser. No. 07/547,006, "Transparent Polycrystalline Garnets", exhibits luminescent properties similar to those in the worst portion of the single crystalline boule in application Ser. No. 07/547,007, now U.S. Pat. No. 5,057,692, "High Speed, Radiation Tolerant, CT Scintillator System Employing Garnet Structure Scintillators". This is believed to be because of increased concentration of host defects as a result of the GGG's polycrystalline structure and preparation and processing history. This can be explained on the basis that many of these host defects are hole traps which compete with the activators for holes generated within the scintillator material during absorption of stimulating radiation, thereby limiting luminescent efficiency.

Because of the spectral characteristics of the light emitted by the GGG doped with chromium during the period of stimulation and steady state output and during the post-stimulation (afterglow) portions of the luminescent response of this material, we conclude that radiative hole-electron recombination at chromium sites is the source of the luminescent light in both situations. In the stimulating radiation intensity range of interest in CT scanning systems and most other systems, the garnet host material does not approach hole trap saturation. As a consequence, the chromium activator and hole traps within the host material compete for holes. On the basis of the afterglow characteristics of these materials, it appears that the hole traps in this material have relatively low thermallization rates. This deduction was supported by a comparison of the pump-up characteristics of this luminescent material, the steady-state emission of this material and the afterglow characteristics of this material. Pump-up is that characteristic of a luminescent material and a scintillator, in particular, in which the luminescent light output rather than increasing instantaneously to its steady-state level in response to a step function in stimulating energy, jumps to an initial value and then increases over a period of time to that steady-state level. This period of time is known as the pump-up period and could be of the order of seconds. That is, the light output upon exposure to a step function in stimulating radiation, jumps to an initial light output value and then increases in an asymptotic manner to the final steady state light output value. The difference between the initial and final steady state light output values as a percentage of the final steady state output value is known as pump-up.

Pump-up can be explained as being due to (or related to) the time constant for hole-traps in the host material to be filled to a steady-state condition in which the percentage of traps occupied has become essentially constant, although individual, unoccupied traps continue to attract holes, while occupied traps release holes in accordance with the thermallization rate for those traps. Once a steady state of hole trap occupancy has been reached, the light output remains constant until the stimulating radiation is removed.

When the stimulating radiation is turned off or the luminescent material is shielded from that stimulating radiation, the light output decreases rapidly in what is known as the primary decay of the luminescent output. This primary decay time is a reflection of the fact that holes (hole-electron pairs) in the luminescent material have a finite lifetime with the result that those holes which are disposed in the valence band in the scintillator material at the time that the stimulating radiation is turned off, have a finite decay time which is reflected as the primary decay. For most luminescent materials, at the end of the primary decay time, the slope of the luminescent light's decay becomes substantially lower and the light output enters the phase known as afterglow.

After the termination of the stimulating radiation, holes continue to be released by (or to escape from) hole traps in the scintillator material at a rate which is determined by thermallization rate for those traps. These escaped or released holes can radiatively recombine at chromium sites, thereby emitting the light which constitutes afterglow. It will be recognized that because of the absence of stimulating radiation, a greatly reduced number of holes are available to be trapped in unoccupied traps. As a consequence, trap occupancy declines to zero over a period of time, just as afterglow decays to zero over a period of time.

In typical applications of scintillator materials, especially in the range of stimulating radiation to which they are exposed in typical diagnostic imaging systems, the host material hole trapping levels are far from being saturated even during the steady state output interval. We concluded that this results in competition between radiative recombination sites (for example, chromium in GGG) and hole-traps (in materials which exhibit hole-trap limited afterglow).

Consequently, we decided that in materials exhibiting hole-trap-limited afterglow, introduction of larger trapping cross-section, substantially faster thermallization rate, hole-trapping species at sufficient concentration should counteract the basic scintillator traps (characterized by relatively slow thermallization rate) and thereby reduce afterglow. These hole trapping species should have the valence state of the element for which they substitute in the lattice of the scintillator material as one of their valence states. This avoids a need to include a compensating addition to maintain charge neutrality. The cerium, terbium and praseodymium have this characteristic when substituted in a garnet structure, since each has a 3+ valence state. The existence of the 3+ valence state does not exclude the possibility that the added species may in fact be found in a 4+ state in the crystalline structure under some conditions.

The introduction of such impurities provides an additional competitor for holes in our new, modified scintillator material. The resulting competition should result in beneficial modification of the scintillator's properties, thereby providing an enhanced scintillator material. If the hole-trapping species has a nearly similar or larger concentration and a larger capture cross-section than the inherent or basic hole traps of the basic scintillator material, then an overall shielding effect should substantially reduce the capture rate for and the occupancy of basic hole traps. The additional hole traps created by the inclusion of the larger cross section, fast thermallization rate, hole trapping species in the scintillator composition can liberate holes either by recombination thereat or by release therefrom. Any released holes are then available to be captured (1) by basic hole traps, (2) by added hole traps (3) by radiative recombination sites or (4) by non-radiative recombination sites.

Radiative recombination at $Cr^{3+}$ sites after hole release would be expected to have no significant effect on the maximum light output, since once a steady-state was reached, the rate of hole generation by stimulating radiation and the rate of hole extinction by radiative recombination should be equal. However, where hole non-radiative recombination at the trapping sites occurs, the light output decreases with increasing concentration of the added hole-trapping species, since that hole-trapping species diverts holes from the radiative recombination mechanism into a non-radiative recombination mechanism.

Another factor which can contribute to reduced light output as a result of the addition of a hole-trapping species to the basic scintillator material is the hole-trapping species being absorptive of the luminescent light frequency of the activator species in the basic scintillator composition. Consequently, for each hole-trapping species, there can be a trade-off between afterglow reduction and an associated reduction in light output or adverse effects on other luminescent properties. As will be observed from the data presented in the tables, afterglow can be reduced by about 97% with only about a 20% reduction in light output by modifying the scintillator composition in accordance with this inventive theory while also reducing radiation damage by as much as 97%.

An added hole-trapping species (hts) has a capture volume of influence which is related to the capture cross-section of the resulting hole trap. The number of basic scintillator traps which are occupied during steady state stimulation may be expressed by the following equation:

$$n = n_0 e^{-VC_{hts}}$$

where the added hole-trapping species has a concentration $C_{hts}$. Thus, the number of occupied basic scintillator traps decreases with increasing concentration of the hole-trapping species and with increasing volume of influence for an individual member of that hole-trapping species. The afterglow data presented in the tables in FIGS. 1, 1A, 2 and 2A support our theory. Tables 1 and 2 present the actual measured values for the individual samples while Tables 1A and 2A present the same data but normallized to each of the data values for the 0.31 wt % $Cr_2O_3$ concentration in the GGG without other intentional additives. Tables 1A and 2A are presented to simplify comparison of the characteristics of the different samples.

We prepared a substantial number of samples in accordance with this invention using the process of related application Ser. No. 07/547,006, "Transparent Polycrystalline Garnets". For this sample preparation process, we chose the ammonium hydroxide process of that application rather than the ammonium oxalate process because the ammonium hydroxide process produces a 100% quantitative yield and thus avoided a need for detailed compositional analysis of the samples. In production, either process may be used as may other processes as may be found desirable.

The source compounds were 99.99% or higher purity in order to minimize the unknown/uncontrolled impurities present in the final composition which can effect radiation damage, afterglow and luminescent efficiency.

We start by forming a hydrochloric acid solution of the desired cat ions in appropriate quantities. By appropriate quantities, we mean relative concentrations which result in the final (preferably transparent) body containing the desired relative proportions of cations.

One way of forming this source chloride solution is by dissolving the source oxides of the desired cations in hot concentrated hydrochloric acid. For those situations where a closely controlled final garnet composition is desired, especially where the absence of unknown impurities is considered desirable, use of source compounds which are of 99.99% or higher purity is preferred. Naturally, the source cations may be provided as chlorides rather than oxides, if desired. Other source compounds may also be used.

Once the source materials have completely dissolved in the hot concentrated hydrochloric acid, the resulting solution is cooled to room temperature. The resulting solution should be clear and free of precipitates and free of settling out of any of the source material. In the event that precipitation or settling out of source material occurs, the solution should be reheated, and additional hydrochloric acid added to the solution so that upon cooling to room temperature again, no precipitation or settling out occurs. That is, enough hydrochloric acid should be used to ensure that the source materials are not present at or above their solubility limit at room temperature.

Separately, an ammonium hydroxide solution is prepared by diluting 30% $NH_4OH$ with an equal volume of deionized water. This diluted $NH_4OH$ is then added drop-wise to the clear chloride solution while stirring vigorously.

During the process of adding the ammonium hydroxide a gel-like precipitate forms. The ammonium hydroxide solution is added until the pH is in the range from 7.8 to 8.3. Once the pH is in that range, precipitation is complete. Since our work was directed to establishing the characteristics of these materials, we dripped the ammonium hydroxide solution into the chloride cation source solution rather than just pouring the two together in order to ensure that no chemical inhomogeneity or separation of phases occurred during our preparation process which might have adversely affected our test samples. This dripping was accomplished at a rapid drip rate which was near-to-stream-like.

If desired, the precipitate may be water and/or alcohol washed before separating the precipitate from the liquid. This is done by allowing the precipitate to settle, pouring off or otherwise removing most of the liquid and adding the wash water or alcohol, allowing the precipitate to settle again, and again removing the clear liquid. Where high purity and/or closely controlled composition of the final transparent garnet is desired, the wash water should be high purity, deionized water and the alcohol should be of standard reagent grade purity. This washing process removes excess ammonium hydroxide and reaction products such as ammonium chloride from the precipitate. The precipitate is then separated from the wash solution by filtering, centrifuging or other appropriate techniques. This precipitate is a multi-component precipitate having a substantially uniform chemical composition. This wet precipitate is believed to be a complex ammonium gadolinium-gallium-chromium hydroxide (when preparing chromium activated GGG), however, the detailed chemical structure of this precipitate has not been exactly determined and does not need to be known for the success of this process. This precipitate is preferably dried, such as by oven drying at a temperature of approximately 110° C. for a day or by vacuum or air drying to produce a fine dry powder.

This fine powder was then heated in air and held at 900° C. for one hour to thermally decompose the hydroxide thereby forming a crystalline garnet powder. The thermal decomposition temperature can vary over a wide range, such as from about 600° C. to 1000° or 1100° C. with a range of 750° C. to 900° C. being typical.

This crystalline garnet powder may be directly pressed to produce a compact for sintering. However, if a transparent final sintered body is desired, it is preferred to mill this powder to reduce agglomeration prior to pressing it to form compacts. This milling may be done in a ball mill using zirconia grinding media and a liquid vehicle such as water, methyl alcohol or isopropyl alcohol. Ball milling times from about 4 to 24 hours are effective. Alternatively, a fluid energy (gas) mill or a jet mill may be used with air pressure settings of from about 60 to about 100 psi. Where chromium is present in the gadolinium gallium garnet, it is preferably in a concentration equivalent to chromium oxide between 0.05 and 1.0 wt. %, most preferably between 0.1 and 0.6 wt. %, of the overall scintillator composition. Where the hole trapping species is cerium, it is present in the gadolinium gallium garnet in a concentration of less than 0.2 wt. %, preferably between 0.005 and 0.15 wt. %, and most preferably between 0.01 and 0.15 wt. % of the overall scintillator composition. In other preferred scintillators, the cerium is present between 0.005 and 0.2 wt. % and between 0.01 and 0.1 wt. % of the overall scintillator composition. Where the hole-trapping species is terbium or praseodymium, it is present in the gadolinium gallium garnet in a concentration between 0.005 and 0.15 weight percent of the overall scintillator composition.

EXAMPLE

A desired reference composition $Gd_3Ga_{4.96}Cr_{0.04}O_{12}$ was prepared by dissolving 5.38 g of $Gd_2O_3$, 4.59 g $Ga_2O_3$ and 0.11 g $CrCl_3 \cdot 6H_2O$ (equivalent to 0.031 g $Cr_2O_3$) in 37.5 ml of concentrated HCl.

Separately, 86.0 cc of 30% $NH_4OH$ was diluted with an equal volume of deionized water. This diluted $NH_4OH$ was then added added drop-wise to the clear chloride solution while stirring vigorously. During this process the pH of the solution was monitored. The ammonium hydroxide solution was added until the pH was increased to 8.1. Once this pH was reached, precipitation was complete, but the precipitate was still suspended in the liquid vehicle because of its fine character.

This suspension was then vacuum filtered to separate the precipitate using medium filter paper. When most of the liquid was gone, but before the liquid level was allowed to reach the precipitate collected on the filter paper, 1000 cc of methanol were added to wash the precipitate and the filtering was allowed to proceed until "all" of the liquid had been removed.

The resulting wet precipitate was dried for 12 hours at 50° C. under vacuum.

This dried precipitate was then heated in air and held at 900° C. for one hour to thermally decompose the hydroxide precipitate to form the garnet phase.

Without having been milled, 1 gram of the resulting garnet powder was die pressed in a 15.9 mm diameter die at a pressure of 3,500 psi followed by isostatic pressing at room temperature at 60,000 psi to form a compact which was then sintered in flowing pure oxygen at a temperature of 1,550° C. for 2 hours. After sintering, the sample was about 12 mm in diameter and about 1.4 mm thick.

All of the samples which provided data for the tables were prepared in this manner with the only difference being the starting composition.

The cerium, terbium and praseodymium additives that are initially introduced into the hydrochloric acid solution substitute in a garnet structure primarily in the 3+ oxidation state and thus were not matched with any compensating elements. However, during the high temperature steps of the scintillator production process, some fraction of these afterglow reducing impurities may change from their initial 3+ valence to a 4+ valence. That fraction is unknown at this time and may vary with the details of the fabrication process. Consequently, the presence of 4+ ions of cerium, terbium or praseodymium may contribute to the beneficial effect of this addition, may detract from it or may have no effect on it.

Pure, stoichiometric gadolinium gallium garnet is comprised of 53.7 weight % $Gd_2O_3$ and 46.3 weight % $Ga_2O_3$. Chromium, when added to GGG as an activator, substitutes for $Ga^{3+}$ in the Ga lattice sites in the garnet structure because of their almost identical ~0.62 Å ionic radii. Consequently, in the tables in the Figures the $Ga_2O_3$ weight % is reduced from the pure stoichiometric GGG weight % by the $Cr_2O_3$ weight %. When $Cr^{3+}$ is the only substituent, the formula may be written $Gd_3Ga_{5-y}Cr_yO_{12}$, where Y represents the number of moles of $Cr^{3+}$ in a mole of the garnet.

Cerium, terbium and praseodymium 3+ ions were concluded to be hole-trapping species with probable fast thermallization times. The hole trapping properties of Ce and Tb when introduced alone into yttrium aluminum garnets are discussed in an article "The Relationship Between Concentration and Efficiency in Rare Earth Activated Phosphors", by D. J. Robbins et al., *J. Electrochemical Society*, September 1979, p. 1556. We propose $Pr^{3+}$ should behave in a similar way based on its redox properties. Consequently, these three potential hole-trapping species were selected for testing to confirm that in fact the intentional addition of hole trapping species into an activated garnet would reduce afterglow in these materials. As will be observed from the data presented in the tables, each of these species in fact produces the expected result of reduced afterglow, although with differing degrees of afterglow reduction at a particular concentration.

When $Ce^{3+}$ is substituted in the GGG, it substitutes for $Gd^{3+}$ in the lattice because the ionic radius of $Ce^{3+}$ (1.14 Å) is not greatly different from the radius (1.06 Å) of $Gd^{3+}$ ions in the eight coordinated sites in GGG and because its radius is much larger than that of $Ga^{3+}$(~0.62 Å). Thus, when $Ce^{3+}$ is present as a substituent in addition to $Cr^{3+}$, the formula may be written $Gd_{3-x}Ce_xGa_{5-y}Cr_yO_{12}$, where X represents the number of moles of $Ce^{3+}$ in a mole of the garnet. The same is true of the two other hole-trapping species listed in tables (terbium and praseodymium) with the result that the $Gd_2O_3$ weight % is reduced from the pure, stoichiometric GGG value by the weight % of the hole-trapping species which is present.

A range of GGG compositions are listed in Tables 1, 1A, 2 and 2A in FIGS. 1, 1A, 2 and 2A, respectively. The compositions and samples are the same in Table 1A as in Table 1 and in Table 2A as in Table 2, with the actual measured values listed in Tables 1 and 2 and relative or normalized values listed in Tables 1A and 2A to simplify interpretation of the data. Each of these samples was prepared and processed in an identical manner by the above described process. Each sample was in excess of 90% of theoretical density. Based on weight loss and lattice parameter studies of garnets, the final compositions are concluded to be essentially as intended. All of the samples were measured in the same manner.

Light output was measured using a photodiode which is sensitive to wavelengths in the 300 nm to 1,100 nm range. For light out measurements the stimulation was a 60 KV/5 ma/0.35 sec x-ray pulse. The measured value is the mean value obtained.

Pumpup was measured with a 60 KV/5 ma/1.12 sec x-ray pulse. Light output was plotted as a function of time from 90% to 100%. The measured pumpup is the percentage rise beyond the primary rise.

Radiation damage was measured by exposing the sample to two consecutive 120 KV/200 ma/4 sec pulses 10 seconds apart for a total exposure of 480 RADs. Light output loss (or gain) with respect to the unexposed sample was determined through probe pulses (60 KV/5 ma/0.2 sec) before and after the 480 RAD dose. A probe pulse 35 seconds after x-ray off is used as the "after" data point for determining the light loss percentage and thus the radiation damage.

Afterglow was measured using a 60 KV/50 ma/0.5 sec x-ray pulse. Light output measurement begins about 100 milliseconds before the x-rays are turned off. The percentage output with respect to the signal with x-rays on is determined as a function of time. The value at 100 msecs after x-rays off is used as the data point. A narrow (0.1 inch wide) x-ray beam is used to avoid saturation of the diode.

Primary speed is measured with a 120 KV/0.05 sec x-ray pulse. Light measurement begins 0.005 sec before the x-rays are turned off. Light output is plotted as a function of time. The elapsed time after x-ray off at which the light output falls to 1/e (36.7%) of the ON light output is the primary speed.

The measured values of scintillator properties are accurate to $\pm 0.05$ V for light output (LO), $\pm 0.05\%$ for pump-up (PU), $\pm 0.02\%$ for afterglow (AFG), $\pm 0.2\%$ for radiation damage (RD) and $\pm 5$ $\mu$s for primary speed (PS).

To summarize the table data, pure GGG doped only with $Cr^{3+}$ had a relatively high afterglow of 1.0% for 0.31 wt % $Cr_2O_3$ and 0.70% for 0.15 wt % $Cr_2O_3$. These afterglows decreased significantly with additions of as little as 0.015 wt % $Ce_2O_3$, and by as much as 97% for compositions containing 0.31 wt % $Cr_2O_3$ and 0.06 to 0.12 wt % $Ce_2O_3$. For terbium (Tb) and praseodymium (Pr) additions, the reductions in afterglow were significant, but not nearly as dramatic. The best of these samples is five times better than the best of the single crystal samples produced in accordance with application Ser. No. 07/547,007 now U.S. Pat. No. 5,057,692, "High Speed, Radiation Tolerant, CT Scintillator System Employing Garnet Structure Scintillators".

The luminescent light output decreased when Ce, Tb or Pr was intentionally added to the Cr activated GGG, except in the case of one sample. Changes in pump up tend to track changes in afterglow for the various hole-trapping centers introduced. Radiation damage values also decreased substantially with increasing hole trapping additions.

The samples which provided the data for the table entries were not transparent, but rather were only opaque/translucent because we chose to omit the milling and hot isostatic pressing steps from the process described in Application Ser. No. 07/547,006, "Transparent Polycrystalline Garnets", in order to expedite sample preparation. To confirm the validity of this technique as a means of determining the utility of these additives for transparent scintillators of the type disclosed in Application Ser. No. 07/547,006, we processed a sample having the composition 53.69 wt % $Gd_2O_3 + 0.051$ wt % Ce + 45.94 wt % $Ga_2O_3 + 0.31$ wt % $Cr_2O_3$ using the full process, including milling and hot isostatic pressing as described in Application Ser. No. 07/547,006. That is, following the thermal decomposition of the dried precipitate, the resulting garnet powder was milled in water for 24 hours using zirconia grinding media to reduce agglomeration (so that all particles are less than 5 microns in size). After the milled suspension was air dried for 24 hours at room temperature, the resulting powder was die pressed at a pressure of 3,500 psi followed by isostatic pressing at room temperature at 60,000 psi to produce a disk-shaped compact for sintering as described above.

Following sintering as described above, the sintered disk was immersed in $Gd_2O_3$ packing powder in a molybdenum crucible after which the loaded crucible was inserted in a HIP furnace and heated at a rate of 25° C./minute up to 1,500° C. in 25,000 psi of argon pressure. After a soak time of one hour at 1,500° C., the furnace and the sample therein were cooled to room temperature and depressurized. After this sample was removed from the hot isostatic pressing furnace, it was given an oxidation treatment at 1,550° C. for two hours in flowing oxygen to remove the dark green cast created by the conditions in the hot isostatic pressing furnace.

This sample was transparent and exhibited measured values of LO=0.55 V, PU=0.1%, AFG=0.02%, RD=0.3%, PS=130 $\mu$s, all of which are within the measurement error of the values obtained for the corresponding opaque/translucent sample which provided the table data for this composition.

In our work with $Cr^{3+}$ activated GGG with cerium as an added hole-trapping species, we have not detected cerium emission lines in the luminescent output up to 850 nm. This leads us to conclude that the cerium hole-trapping species acts (1) solely as a storage site for holes which reduces the occupancy of traps in the basic scintillator composition, (2) as a recombination site at which holes recombine by a non-radiative process or (3) a combination of (1) and (2). It is possible that there is cerium emission at a very low intensity which we have not detected. Even if such emission is present, its low level indicates that it is not a significant recombination path in our improved scintillator material.

With cerium as the only dopant or potential activator added to GGG, a cerium concentration of 60 parts per million (ppm) results in weak luminescence in response to x-ray excitation. At 260 ppm there is little or no luminescence and at 600 ppm luminescence is virtually undetectable. The absence of significant $Cr^{3+}$ luminescence in the cerium/chromium co-doped GGG is consistent with this observation.

As a further confirmation of our hole-trap-limited afterglow theory, we selected an effective electron trapping species (europium) for addition to the basic scintillator composition with the expectation that addition of an electron trapping species would further separate electron-hole pairs and exacerbate the problem of afterglow. In other words, the presence of $Eu^{3+}$ as an electron trap would promote the charge separation between electrons trapped at $Eu^{3+}$ sites and holes trapped in the basic scintillator composition's traps. As can be seen from the europium data (final entry in the tables in FIGS. 2 and 2A), addition of europium did in fact produce the expected increase in afterglow. The afterglow with europium almost doubled as compared to the $Cr^{3+}$ only sample while light output decreased by 36%.

It will be understood that the individually identified garnets do not need to be at their stochiometric composition, but may be a solid solution with a composition anywhere in the garnet phase composition range at the processing temperatures so that a single phase garnet crystalline structure results, and that this restriction on composition only applies where a transparent scintillator is desired. By the solid solution composition range, we mean the range of compositions for which the garnet phase is stable as a single phase in accordance with the published phase diagram for the $Gd_2O_3$-$Ga_2O_3$ system. Outside that range the body is not a single phase because of the presence of a second phase which results in a phase mixture rather than a solid solution.

While specific compositions have been specified, it will be recognized that other non-detrimental substituents may be substituted for some of an element without departing from the scope of the appended claims, so long as the overall scintillation properties are acceptable. As an example, we know that when we mill powders with zirconia milling media, zirconia is introduced into the composition in amounts which we have measured as high as 894 ppm. It is not known whether this added zirconium substitutes for one of the other elements or ends up in the structure in an intersitial location or primarily at grain boundaries. This addition occurs without apparent adverse effect on the scintillator's characteristics as can be seen from a comparison of the transparent sample's characteristics and the characteristics of the same composition sample presented in Table 1 (which, since it was not milled does not include this zirconium addition). Hafnium, measured at as high as 12 ppm can also be added without apparent adverse affect. It is also possible that the zirconium acts as a transparency promoter during the sintering process. Similarly, yttrium and aluminum measured at as high as 79 ppm and 39 ppm, respectively, can be partially substituted, respectively, for the gadolinium and the gallium. These concentrations were measured by glow discharge mass spectrometry. The upper limit on concentration which does not produce an adverse effect is unknown for each of these substituents and other substituents may be included without adverse effect. Thus, the limits of composition for the specific scintillators are defined by their primary constituents and their luminescent properties rather than being strictly limited to specified composition since other elements can be added without adversely affecting the scintillator's luminescent properties. That is, there is a wide range of actual compositions for which the luminescence is a result of the presence of a $Cr^{3+}$ co-doped garnet which is gadolinium and gallium based.

These enhanced scintillator materials are suitable for use with such high energy stimulation as x-rays, nuclear radiation, and an electron beam.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a computed tomography machine of the type having a solid state scintillator, the improvement comprising:

said solid state scintillator being a crystalline structure solid solution comprising gadolinium gallium garnet having the formula $Gd_3Ga_5O_{12}$, chromium in a concentration in said garnet equivalent to chromium oxide being between 0.05 and 1.0 weight percent of the overall scintillator which is effective to render said scintillator luminescent in response to high energy stimulating radiation consisting of x-rays produced by said machine, and cerium in a concentration in said garnet of less than 0.2 weight percent of the overall scintillator, which is effective to reduce the afterglow level relative to the afterglow level of said scintillator in the absence of cerium said chromium being substituted in said formula for said Ga and said cerium being substituted in said formula for said Gd.

2. The computed tomography machine recited in claim 1 wherein said weight percent of chromium is between 0.1 and 0.6.

3. The computed tomography machine recited in claim 1 wherein said weight percent of cerium is between 0.01 and 0.15.

4. The computed tomography machine recited in claim 1 wherein said weight percent of cerium is between 0.005 and 0.2.

5. The computed tomography machine recited in claim 1 wherein said weight percent of cerium is between 0.01 and 0.1.

6. The computed tomography machine recited in claim 1 wherein said scintillator structure is polycrystalline.

7. The computed tomography machine recited in claim 6 wherein said scintillator structure is transparent.

* * * * *